United States Patent Office 3,262,776
Patented July 26, 1966

3,262,776
MEDIUM CARBON VANADIUM STEEL
John E. Loeffler and Obert L. Nordin, Houston, Tex.,
assignors to Thornhill-Craver Company, Houston, Tex.,
a corporation of Texas
No Drawing. Filed May 9, 1963, Ser. No. 279,302
13 Claims. (Cl. 75—123)

This invention relates to steel, and more particularly to a medium carbon-high strength steel which has good welding characteristics.

In recent years, the pipeline industry has gone to increasingly larger diameter pipe, and has increased the pipeline operating pressure. The sizes and pressures involved have reached the point that a critical problem exists in supplying valves and the like for use in such pipelines.

Medium carbon steel, such as ASTM Designation A216–59T Grade WCB, has been used for this service in the past. The code strength prescribed for such steel is 70,000 p.s.i. minimum tensile strength and 36,000 p.s.i. minimum yield point. With larger and larger valves being required, a point has been reached where this steel, in the wall section of fittings formerly used, is becoming inadequate. Lower transition temperature of the metal material is also now required to assure elimination of the cleavage type ruptures prevalent when failures occur in these systems.

While procedures are available for increasing strength in other type service, such as cold working, quenching, etc., construction codes will not permit the fitting manufacturers to select these methods for pipeline fittings due to the fact that the fittings are welded in place in the pipeline.

One solution to the problem would be to merely increase the wall sections by about 20% to obtain additional strength. However, to do so would necessitate a readjustment of the design casting factors because, as the wall sections increased, center line weakness of the castings would increase, thus requiring an additional increase in wall section. The result could be an increase in weight of each fitting as much as 50%. This, of course, would require new patterns for all fittings which would be very expensive.

The only alternative solution was the development of a new weldable steel which would give the desired increased strength.

By this invention, a new stronger steel is provided which meets code requirements for pipeline fitting service.

An object of this invention is to provide a new medium carbon steel which will meet the specifications of ASTM Designation A216–59T Grade WCB steel, and will have substantially higher tensile strength and yield point than heretofore possible.

Another object is to provide a new steel for pipeline fittings which has a greater yield point and tensile strength than steels heretofore available and usable for this purpose.

Another object is to substantially increase the strength of a medium carbon steel without decreasing the weldability of the steel.

Another object is to provide a medium carbon steel from scrap in which the yield point and tensile strength of the steel is greatly increased without impairing the weldability of the steel by adding vanadium to the steel.

It has been discovered that if the chemistry of the melt be controlled so that the various elements in the steel are kept within prescribed limits, and all of the elements in the steel considered in determining the hardenability or weldability of the steel, plus the addition of vanadium in an amount related to the total composition hardenability index of all of the elements of the steel, that a new improved steel will result if the steel is properly treated during refining. Composition hardenability index is the amount of hardenability of the final steel attributable to the elements in the steel other than iron. The steel must be carefully controlled during refining so that the resulting chemistry of the final steel is within the prescribed limits and after the melt has cooled it must then be normalized or raised to a solution temperature at which all of the vanadium in the steel will go into solid solution.

Briefly, the chemistry of the resulting steel should be about 0.24% to 0.35% carbon, about 0.45% to 1.15% manganese, about 0.40% to 0.60% silicon, about 0.03% to 0.15% vanadium, plus residuals in the scrap and the balance substantially iron. The residuals plus vanadium should not be more than about 1% of the steel. The phosphorous and sulphur should be removed as much as possible, and there should not be more than about 0.05% phosphorous, or 0.06% sulphur. The residuals in the scrap including copper, nickel, chromium, molybdenum and tungsten should be in limited percentages. Copper should not be more than about 0.50%. Nickel should not be more than about 0.50%. Chromium should not be more than about 0.25%; and the combined molybdenum and tungsten should not be more than about 0.25%.

Considering all of the elements in the steel other than the iron, their combined composition hardness index should preferably be within the range of about 2050 to 2600, according to the hardness factors developed by Bethlehem Steel Company. After the steel has been cooled, it should then be heated to at least the solid solution temperature of the quantity of vanadium in the steel.

Carbon adds both strength and hardness to the steel. However, its percentage must be limited to avoid impairing the weldability of the steel. It has been found that the carbon should be limited to a maximum of about 0.35%. To obtain the desired strength and toughness, there should be at least about 0.24% of carbon. Preferably, the range is held to a spread of 0.25% to 0.30% and the foundry should try to attain 0.27% carbon in the final steel to give the maximum amount of carbon possible, but yet leave sufficient operating spread so that the foundry will maintain the carbon content within the 5 point spread of 0.25% to 0.30% carbon.

The manganese should be limited to a range of about 0.45% to 1.15%. Preferably, the manganese is limited to 0.70% to 0.95%. For the ideal steel containing 0.27% carbon, it is preferred that the manganese content be 0.85%. The manganese adds to the hardness, the strength, and the toughness of the material. As the amount of manganese is reduced, the steel loses strength, toughness and elongation, and therefore the minimum specified above should be present. The manganese cannot be increased to too high a level, as it would increase the hardness of the steel and impair its weldability.

The silicon content of the steel should not be below about 0.40% or above about 0.60%. Preferably, the silicon is in the range of 0.45% to 0.58% and with the preferred composition of carbon and manganese specified above, the silicon preferably is present in an amount of about 0.52%. The silicon should not be below about 0.40% as this reduces the flowability and castability of the steel. The maximum of 0.60% should not be exceeded due to the embrittling character of silicon.

The less phosphorus present, the better. In any event, there should not be present more than about 0.05% phosphorus, and preferably not more than about 0.015%.

Sulphur should also be excluded from the steel as much as possible, and, in any event, should be held below 0.06%. Preferably, the sulphur is held below 0.02%.

The remaining constituents of the steel, other than iron, should be limited to a total of 1% of the steel.

The scrap utilized in making steel will, of course, have residual elements other than iron. For example, the scrap may contain copper, nickel, chromium, molybdenum and tungsten. Usually these will be the only elements present in the scrap. The residual copper should not be more than 0.5%. The residual nickel should not be more than 0.5%. The residual chromium should not be more than 0.25%. The residual molybdenum plus tungsten should not be more than 0.25%. In the ideal or preferred formulation in which the carbon is about 0.27%, the manganese about 0.85%, and the silicon about 0.52%, the maximum percentages of residuals are as follows: Copper 0.1%, nickel 0.13%, chromium 0.16%, and molybdenum plus tungsten 0.06%.

In accordance with this invention, an amount of vanadium is added which, combined with the other elements above mentioned, will result in a steel which has increased strength and better weldability. The vanadium is added in such an amount and the steel is treated in such a way that the substantial additional hardness obtained by using vanadium is present without impairing the weldability of the steel. In fact, the weldability of the steel is enhanced.

The amount of vanadium to be added has been found to range from about 0.03% to 0.15%. Preferably, the vanadium will be in a range of about 0.06% to 0.12%. In the preferred composition of steel defined hereinabove, the vanadium required is about 0.08%. While the range of carbon to vanadium is wide, it is preferred that for each percent of carbon there be present about 0.33% vanadium.

Composition hardenability factors are used to determine the hardenability of steel containing all of the elements. These factors for many metals have been determined by Bethlehem Steel Company. Composition hardness factors for the elements which will normally be encountered in refining the steel of this invention are as follows:

Carbon _____ 3000
Silicon _____ 500
Manganese _____ 800
Phosphorous _____ 4000
Sulphur _____ 1000
Chromium _____ 500
Nickel _____ 400
Molybdenum _____ 1600
Copper _____ 400
Tungsten _____ 400
Vanadium _____ 2000

To obtain a good weldable steel which will have higher strength than heretofore possible, an amount of vanadium is added to the melt which, taking into consideration the chemistry of the elements in the melt, will result in a total composition hardenability index of about 2050 to 2600. A range of 2150 to 2250 will give best results. For instance, the preferred formulation of steel in accordance with this invention would have the following composition hardness:

|  | Percent Present |  | Factor |  | Index |
|---|---|---|---|---|---|
| Carbon | 0.27 | × | 3,000 | = | 810 |
| Manganese | 0.85 | × | 800 | = | 680 |
| Silicon | 0.52 | × | 500 | = | 260 |
| Phosphorous | 0.015 | × | 4,000 | = | 60 |
| Sulphur | 0.020 | × | 1,000 | = | 20 |
| Nickel | 0.13 | × | 400 | = | 52 |
| Chromium | 0.16 | × | 500 | = | 80 |
| Molybdenum | 0.06 | × | 1,600 | = | 96 |
| Vanadium | 0.08 | × | 2,000 | = | 160 |
| Total composition hardness index |  |  |  |  | 2,218 |

It will be seen that with the preferred formulation that the addition of about 0.08 vanadium will increase the hardenability of the steel to 2218. If some of the elements were present in lesser amount, then the vanadium would be increased to maintain the composition hardenability of the melt. For instance, if the manganese present be only 0.80%, the composition hardness of the steel would be reduced by a factor of 40. This could be offset by increasing the vanadium to 0.10% to bring this composition hardenability back up to about 2218. Alternatively, the vanadium could be left at the same level and the composition hardness would be 2178, a value within the preferred range.

It is believed that the vanadium forms with some of the carbon present the carbide $V_4C_3$, and when the melt is poured this carbide is found in the grain of the metal. This will lessen the hardenability of the steel and provide hard spots in the metal. By raising the temperature of the metal in a subsequent heat treatment to the temperature of solid solution of the carbide, the carbide will flow into the matrix and provide increased hardness and good welding characteristics.

It has been found that a steel heat treated as discussed herein and having the preferred total composition index will result in a minimum tensile strength of about 85,000 and a minimum yield point of about 55,000. The elongation in 2 inches will be about 25%, and the reduction of area will be about 50%.

It has been found that so long as the steel is maintained within the ranges specified hereinabove, that a suitable high strength steel having good welding characteristics will result. If the total composition hardness be below the preferred total of 2150, the strength of the steel usually will be less than where the preferred range is obtained. However, it will be a stronger steel than would be present if this invention were not followed. Conversely, a greater total composition hardness than 2250 may be used, and it has been found that a steel having a slight excess of carbon and manganese, for instance, will give a much higher strength steel having acceptable weldability characteristics. Such steel will tend to be more borderline in its welding characteristics, and for this reason it is preferred that the range of 2150 to 2250 total composition hardness be utilized to obtain the best quality steel with the best welding characteristics.

Vanadium, when in solid solution in the steel, has the characteristic of not only imparting substantial additional hardness to the steel, but also of enhancing the weldability of the steel. The vanadium controls the after welding effects of the cooling rate of the steel and prevents the formation of areas of excess hardness after welding.

From what has been said above, it is apparent that if a steel is made which has a composition hardness of about 2050, then the steel will be on the borderline insofar as obtaining the desired hardness. On the other hand, if we increase the composition hardness by another 100 points or so above the preferred top range of 2250, then we will be able to increase the mechanical strength of the steel but, due to this increased hardness, the weldability of the steel will be slightly decreased. Thus, while a useful steel can be made in accordance with this invention having a combined hardness of about 2050 to 2600, it is apparent that it is preferred that the combined hardness be held within the range of 2150 to 2250.

The vanadium should be present in at least an amount of 0.03% to lend its characteristic of after welding cooling effect control to prevent the formation of hard spots in the metal.

An amount greater than the maximum of 0.15% vanadium could theoretically be used, but difficulty would be experienced in getting the excess vanadium into solid solution without impairing the grain size. Vanadium has been used in many different ways and for many different purposes in making steel. It has been discovered that it will permit a great increase in strength of the steel while enhancing the weldability characteristics of the steel if the vanadium present is in solid solution. In order to place the vanadium in the melt in solid solution, the steel must be heat treated at at least the temperature of solubility of the quantity of vanadium in the steel. Thus, after the casting or billet has cooled, it is placed in a suitable furnace and brought up to at least the solution temperature for the vanadium in the melt. For a melt having a vanadium content of 0.03%, the solution temperature for the quantity of vanadium present is 1520° F. For each increase of 0.01% of vanadium, the solution temperature increases 20° F. Thus, where the preferred composition is used wherein there is present 0.08% vanadium, the solution temperature for this quantity of vanadium is 1630° F. and the melt should be heat treated at at least 1630° F.

As the percentage of vanadium increases, the temperature of solubility for the quantity of vanadium increases and the temperature reaches an extent at which the grain size of the metal increases to an undesirable extent. The mean grain size for a steel formulated in the manner of this invention and normalized at around 1630° F. will have a mean No. 7½ grain. The grain size does not increase too rapidly until we reach around 1750 to 1800° F. From this point, however, the grain tends to increase rather rapidly, and will drop to around a number 3 or 4 at about 1900° F. For this reason the vanadium should be limited to 0.15% so that the vanadium can be placed in solution without reaching the critical range of 1800° to 1900° F.

In accordance with this invention, the scrap coming into the foundry from known sources is statistically analyzed to determine its content of residuals. By statistically analyzed, is meant obtaining scrap from a source which is known to give scrap having uniform chemistry, and, if desired, mixing this scrap with scrap from other sources having a uniform chemistry, so that the final charge of scrap into the furnace will be one which is from a source known to have certain percentages of residuals therein based upon prior chemical analysis of steel manufactured from scrap from the same sources. Thus, if a melt is made with steel from a common source or group of sources which has been found to have a given chemistry in the final product, the prior analysis of the steel can be relied upon as giving the percentage of residual elements present in the scrap in the melt.

While in the furnace, the amount of carbon is controlled by injecting oxygen into the molten steel if too much carbon be present, or by adding carbon if additional carbon be needed. Manganese and silicon are normally added to the charge while in the furnace. Other killing elements are usually utilized. For instance, after the steel is poured into the ladle, a small bar of aluminum is usually added as a further killing agent. Where this is done, the aluminum will be lost during the killing process. In any event the steel is substantially fully killed before vanadium is added. The amount of vanadium added should be about 1 to 1.6 times the amount of vanadium desired in the final melt. Excess vanadium may be needed because vanadium itself is an excellent killing agent, and some percentage of the vanadium may be lost in the foundry while the steel is in the ladle due to its action as a killing agent. The excess amount of vanadium to be added will depend upon foundry practice, as different amounts will be lost in different foundries.

Steel from the ladle may be thereafter handled in any desired manner, as, for instance, it may be poured into castings for making pipeline fittings. In any event, after the steel has cooled, it is carried to the furnace section of the foundry and brought up to the solubility temperature for the quantity of vanadium present in the melt. The steel should remain in the furnace for a sufficient time to permit the entire body of steel to be brought up to the solubility temperature so that the vanadium will be in solution all the way through the steel.

In accordance with the preferred form of this invention, the casting, etc. is annealed by permitting it to cool while in the furnace, or to be normalized by cooling in dead air. After the steel is cooled, it may then be tempered and drawn at a suitable temperature, such as, for instance, 1100° F.

It might be pointed out that with the preferred treatment of steel, the end product can be freely welded in the field without it being necessary to heat treat the fitting after welding to relieve stresses. The steel may be quenched, if desired, to obtain the much greater strength possible with this type of steel.

*Example 1*

A melt of steel refined in accordance with this invention had the following chemistry on analysis: Carbon 0.24%, manganese 0.82%, silicon 0.59%, phosphorous 0.013%, sulphur 0.019%, chromium 0.16%, nickel 0.09%, molybdenum 0.07%, and vanadium 0.09%. The total composition hardenability index of this metal was 2150. On test this steel had a yield point of 64,000 p.s.i. and a tensile strength of 87,500 p.s.i. Using standard procedures prescribed by ASTM, it was found that the percentage elongation in 2 inches was 31% with a reduction in area of 53%. The Brinell hardness of the metal was 179. Impact properties were determined by testing a set of three full size Charpy Keyhole ASTM Type "B" notched specimens at −50° F. These properties were 22, 22 and 23. This metal was welded and the after welding physicals were; yield point 70,404 p.s.i., tensile strength 88,331 p.s.i., and 24% elongation. From this same melt a second specimen was welded and evidenced a yield point of 74,213 p.s.i., and a tensile strength of 88,456 p.s.i., with 32% elongation. Side bends and X-rays showed the welded plates to be satisfactory.

*Example 2*

A second melt was refined in accordance with this invention and had the following chemistry on analysis: Carbon 0.32%, manganese 1.03%, silicon 0.47%, phosphorous 0.013%, sulphur 0.021%, chromium 0.19%, nickel 0.14%, molybdenum 0.04%, and vanadium 0.13%. This steel had a total composition hardenability index of 2567. This steel had a yield point of 70,000 p.s.i., and a tensile strength of 102,000 p.s.i. The percentage elongation in 2 inches was 20% with a 39.8% reduction in area. The Brinell hardness was 207 and the three Charpy readings were 14, 18 and 15. After welding, one specimen had a yield point of 77,465 p.s.i., with a tensile strength of 96,831 p.s.i. and an elongation in 2 inches of 23%. Another specimen had a yield point of 77,446 and a tensile strength of 97,090 p.s.i. with an elongation in 2 inches of 28%. The side bends and X-rays showed these welded plates to be satisfactory.

*Example 3*

Another melt of steel refined in accordance with this invention had the following chemistry on analysis: Carbon 0.30%, manganese 0.88%, silicon 0.47%, phosphorous 0.012%, sulphur 0.020%, chromium 0.12%, nickel 0.19%, molybdenum 0.06%, and vanadium 0.10%. The total composition hardness index of this steel was 2341. The steel had a yield point of 66,000 p.s.i. with a tensile strength of 93,000 p.s.i. Percentage elongation was 24% with a 44% reduction in area. The Brinell hardness was 192, and the three Charpy readings were 6, 10 and 19. After welding specimens gave the following data: First specimen 79,038 p.s.i. yield point; 92,211 p.s.i. tensile strength, with a 20% elongation. A second specimen gave a yield point of 71,599 p.s.i. with a tensile strength of 94,272 p.s.i., and a 30% elongation. Side bends and X-rays showed the welded plates to be satisfactory.

The foregoing disclosure and description of the invention is illustrative and explanatory thereof and various changes in the process and in the material and amounts thereof may be made within the scope of the appended claims without departing from the spirit of the invention.

What we claim is:

1. A steel containing essentially about 0.24% to 0.35% carbon; about 0.45% to 1.15% manganese; about 0.40% to 0.60% silicon; about 0.03% to 0.15% vanadium; not more than about 0.05% phosphorous, 0.06% sulphur, 0.50% copper, 0.50% nickel, 0.25% chromium, 0.25% molybdenum plus tungsten; and the balance essentially iron;

the composition hardenability index of all of said elements other than iron being between about 2050 and 2600;
said vanadium being in solid solution in the matrix.

2. A steel containing essentially about 0.24% to 0.35% carbon; about 0.45% to 1.15% manganese; about 0.40% to 0.60% silicon; about 0.03% to 0.15% vanadium; not more than about 0.05% phosphorous, 0.06% sulphur, 0.50% copper, 0.50% nickel, 0.25% chromium, 0.25% molybdenum plus tungsten; and the balance essentially iron;

the composition hardenability index of all of said elements other than iron being between about 2050 and 2600;
said steel having been normalized at at least the temperature of solid solubility of the quantity of vanadium in the steel.

3. A steel containing essentially about 0.24% to 0.35% carbon; about 0.45% to 1.15% manganese; about 0.40% to 0.60% silicon; about 0.03% to 0.15% vanadium; not more than about 0.05% phosphorus, 0.06% sulphur, 0.50% copper, 0.50% nickel, 0.25% chromium, 0.25% molybdenum plus tungsten; and the balance essentially iron; wherein the iron, carbon, manganese, silicon, phosphorous and sulphur are 99% of the steel;

the combined hardness factor of all of said elements other than iron being between about 2050 and 2600;
said vanadium being in solid solution in the matrix.

4. A steel containing essentially about 0.25% to 0.30% carbon; about 0.70% to 0.95% manganese; about 0.45% to 0.58% silicon; about 0.06% to 0.12% vanadium; not more than about 0.05% phosphorous, 0.06% sulphur, 0.50% copper, 0.50% nickel, 0.25% chromium, 0.25% molybdenum plus tungsten; and the balance essentially iron;

the combined hardness factor of all of said elements other than iron being between about 2050 and 2600;
said vanadium being in solid solution in the matrix.

5. A steel containing essentially about 0.25% to 0.30% carbon; about 0.70% to 0.95% manganese; about 0.45% to 0.58% silicon; about 0.06% to 0.12% vanadium; not more than about 0.05% phosphorous, 0.06% sulphur, 0.50% copper, 0.50% nickel, 0.25% chromium, 0.25% molybdenum plus tungsten; and the balance essentially iron;

the combined hardness factor of all of said elements other than iron being between about 2150 and 2250;
said steel having been normalized at at least the temperature of solid solubility of the quantity of vanadium in the steel.

6. A steel containing essentially about 0.25% to 0.30% carbon; about 0.70% to 0.95% manganese; about 0.45% to 0.58% silicon; about 0.06% to 0.12% vanadium; not more than about 0.05% phosphorous, 0.06% sulphur, 0.50% copper, 0.50% nickel, 0.25% chromium, 0.25% molybdenum plus tungsten; and the balance essentially iron; wherein the iron, carbon, manganese, silicon, phosphorous and sulphur are 99% of the steel;

the combined hardness factor of all of said elements other than iron being between about 2150 and 2250;
said vanadium being in solid solution in the matrix.

7. A steel containing essentially about 0.27% carbon; about 0.85% manganese; about 0.52% silicon; about 0.08% vanadium; not more than about 0.05% phosphorous, 0.06% sulphur, 0.50% copper, 0.50% nickel, 0.25% chromium, 0.25% molybdenum plus tungsten; and the balance essentially iron;

the combined hardness factor of all of said elements other than iron being between about 2050 and 2600;
said vanadium being in solid solution in the matrix.

8. A steel containing essentially about 0.27% carbon; about 0.85% manganese; about 0.52% silicon; about 0.08% vanadium; not more than about 0.05% phosphorous, 0.06% sulphur, 0.50% copper, 0.50% nickel, 0.25% chromium, 0.25% molybdenum plus tungsten; and the balance essentially iron;

the combined hardness factor of all of said elements other than iron being between about 2150 and 2250;
said steel having been normalized at at least the temperature of solid solubility of the quantity of vanadium in the steel.

9. A steel containing essentially about 0.27% carbon; about 0.85% manganese; about 0.52% silicon; about 0.08% vanadium; not more than about 0.05% phosphorous, 0.06% sulphur, 0.50% copper, 0.50% nickel, 0.25% chromium, 0.25% molybdenum plus tungsten; and the balance essentially iron; wherein the iron, carbon, manganese, silicon, phosphorous and sulphur are 99% of the steel;

the combined hardness factor of all of said elements other than iron being between about 2150 and 2250;
said vanadium being in solid solution in the matrix.

10. The method of making steel comprising;
charging a furnace with metal whose chemistry has been statistically analyzed;
controlling the chemistry of the melt so that the final steel will have a composition of about 0.24% to 0.35% carbon; about 0.45% to 1.15% manganese; about 0.40% to 0.60% silicon; about 0.03% to 0.15% vanadium; not more than about 0.05% phosphorous, 0.06% sulphur, 0.5% copper, 0.5% nickel; 0.25% chromium, 0.25% molybdenum plus tungsten; and the balance substantially iron;
pouring said melt into molds and permitting it to gradually cool;
and then heating the resulting product to the temperature of solid solubility of the quantity of vanadium present to place the vanadium in solid solution in the matrix;
the combined hardness factor of all of said elements other than iron being between about 2050 and 2600.

11. The method of making steel comprising;
charging a furnace with metal whose chemistry has been statistically analyzed;
controlling the chemistry of the melt so that the final steel will have a composition of about 0.25% to 0.30% carbon; about 0.70% to 0.95% manganese; about 0.45% to 0.58% silicon; about 0.06% to 0.12% vanadium; not more than about 0.05% phosphorous, 0.06% sulphur, 0.50% copper, 0.50% nickel, 0.25% chromium, 0.25% molybdenum plus tungsten; and the balance substantially iron;
pouring said melt into molds and permitting it to gradually cool;
and then heating the resulting product to at least the temperature of solid solubility of the quantity of vanadium present to place the vanadium in solid solution in the matrix;
the combined hardness factor of all of said elements other than iron being between about 2050 and 2600.

12. The method of making steel comprising;
charging a furnace with metal whose chemistry has been statistically analyzed;
controlling the chemistry of the melt so that the final steel will have a composition of about 0.27% carbon; about 0.85% manganese; about 0.52% silicon; about 0.08% vanadium; not more than about 0.05% phosphorous, 0.06% sulphur, 0.50% copper, 0.50% nickel, 0.25% chromium, 0.25% molybdenum plus tungsten; and the balance substantially iron;
pouring said melt into molds and permitting it to gradually cool;
and then heating the resulting product to at least the temperature of solid solubility of the quantity of vanadium present to place the vanadium in solid solution in the matrix;

the combined hardness factor of all of said elements other than iron being between about 2150 and 2250.

13. The method of making steel comprising;

charging a furnace with scrap metal whose chemistry has been statistically analyzed and selected so that the final steel obtained therefrom will not have more than about 0.05% phosphorous, 0.06% sulphur, 0.50% copper, 0.50% nickel, 0.25% chromium, and 0.25% molybdenum plus tungsten;

controlling the chemistry of the melt in the furnace so that the final steel composition will include about 0.25% to 0.30% carbon, about 0.70% to 0.95% manganese, about 0.45% to 0.58% silicon, and about 0.06% to 0.12% vanadium;

said control of the chemistry of the melt being obtained by adding carbon, manganese and silicon as needed and by adding the amount of vanadium needed to give a resulting combined hardness factor of all of the elements other than iron of between 2050 and 2600;

and then normalizing the resulting product at at least the temperature of solid solubility of the quantity of vanadium in the steel.

References Cited by the Examiner

UNITED STATES PATENTS

| 2,595,294 | 5/1952 | Reese | 75—130 X |
| 2,793,114 | 5/1957 | Moore | 75—130 |
| 2,871,117 | 1/1959 | Korchynsky | 75—123 |

DAVID L. RECK, *Primary Examiner.*

P. WEINSTEIN, *Assistant Examiner.*